United States Patent
Liu et al.

(10) Patent No.: US 8,133,934 B2
(45) Date of Patent: Mar. 13, 2012

(54) METHODS FOR FORMULATING LATEXES SUITABLE FOR THERMAL INK-JET APPLICATIONS

(75) Inventors: Hui Liu, San Diego, CA (US); Paul Joseph Bruinsma, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 717 days.

(21) Appl. No.: 11/796,629

(22) Filed: Apr. 27, 2007

(65) Prior Publication Data

US 2008/0269373 A1  Oct. 30, 2008

(51) Int. Cl.
*C09D 11/10* (2006.01)
(52) U.S. Cl. .......................... 523/160; 523/161; 524/556
(58) Field of Classification Search .................. 523/160, 523/161; 524/556; 106/31.13
See application file for complete search history.

(56) References Cited

U.S. PATENT DOCUMENTS

| | | |
|---|---|---|
| 5,554,739 A | 9/1996 | Belmont |
| 5,927,118 A | 7/1999 | Minote et al. |
| 5,990,202 A | 11/1999 | Nguyen et al. |
| 6,057,384 A | 5/2000 | Nguyen et al. |
| 6,248,805 B1 | 6/2001 | Nguyen et al. |
| 6,417,249 B1 | 7/2002 | Nguyen et al. |
| 2004/0157956 A1* | 8/2004 | Vincent et al. ................ 523/160 |
| 2006/0235110 A1 | 10/2006 | Vincent et al. |
| 2008/0303874 A1* | 12/2008 | Kim et al. ...................... 347/65 |

* cited by examiner

*Primary Examiner* — David W Wu
*Assistant Examiner* — Vu A Nguyen

(57) ABSTRACT

A method of formulating a latex ink composition for a specific application temperature can include the steps of determining an application temperature for the latex ink composition; choosing at least one polar monomer having a dielectric constant of at least about 3.1; synthesizing latex particulates using the at least one polar monomer; admixing the latex particulates with a colorant, in a liquid vehicle, to form the latex ink composition; where the latex particulates are film forming at or below the application temperature, and the $T_g$ of the latex particulates is no more than about 15° C. less than the application temperature.

13 Claims, No Drawings

METHODS FOR FORMULATING LATEXES SUITABLE FOR THERMAL INK-JET APPLICATIONS

BACKGROUND OF THE INVENTION

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers.

Though there has been great improvement in ink-jet printing, accompanying this improvement are increased demands by consumers in this area, e.g., higher speeds, higher resolution, full color image formation, increased stability, etc. As new ink-jet inks and print engines are developed, there have been several traditional characteristics to consider when evaluating the ink in conjunction with a printing surface or substrate. Such characteristics include edge acuity and optical density of the image on the surface, gloss, black to color bleed control, dry time of the ink on the substrate, adhesion to the substrate, lack of deviation in ink droplet placement, resistance of the ink after drying to water and other solvents, long term storage stability, and long term reliability without pen material degradation or nozzle clogging.

However, ink-jet prints have also been known for poor durability when exposed to water or high humidity. This results from the use of water-soluble and water dispersible colorants within the water-based ink. In response to this problem, latex polymers that are compatible with ink-jet inks have been incorporated with the inks. The latex can consist of small micron or submicron hydrophobic polymeric particles of high molecular weight that are dispersed in the aqueous ink-jet ink. When printed as part of an ink-jet ink, a latex component of the ink can form a film on a media surface, entrapping and protecting the colorant within the hydrophobic print film. While latexes can improve overall durability, they often hamper jettability and reliability. Accordingly, investigations continue into developing latex ink formulations that have acceptable durability while maintaining jettability and reliability.

DETAILED DESCRIPTION OF THE PREFERRED EMBODIMENT(S)

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that the singular forms "a," "an," and "the" include plural referents unless the context clearly dictates otherwise. Thus, for example, reference to "an ink" includes one or more of such inks, reference to "an amount of monomers" includes reference to one or more amounts of monomers, and reference to "the latex particulate" includes reference to one or more latex particulates.

As used herein, "vehicle," "liquid vehicle" or "ink vehicle" refers to the liquid fluid in which colorant is placed to form an ink. Liquid vehicles are well known in the art, and a wide variety of liquid vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as latexes, polymers, UV curable materials, and/or plasticizers.

As used herein, "ink" refers to a single liquid vehicle that contains at least one colorant, and in accordance with certain embodiments of the present invention, at least one type of latex particulate.

As used herein, "colorant" can include dyes, pigments, and/or other particulates that may be suspended or dissolved in an ink vehicle containing latex particulates prepared in accordance with embodiments of the present invention. Dyes are typically water soluble, and therefore, can be desirable for use in many embodiments. However, pigments can also be used in other embodiments. Generally, pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer, an oligomer, or a surfactant, for example) in the liquid vehicle and/or in the pigment that utilizes a physical coating to aid the pigment in becoming and/or substantially remaining dispersed in a liquid vehicle. Additionally, encapsulated pigments can be used. Encapsulated pigments are pigments having their surface covered, at least in part, with a latex coating.

As used herein, "media substrate" or "substrate" includes any substrate that can be used in the ink-jet printing arts including papers, overhead projector plastics, coated papers, fabric, art papers (e.g. water color paper), and the like.

As used herein, "latex particulates" or "latex particles" refer to the polymeric masses synthesized from individual monomers, which can be dispersed in a liquid vehicle forming a latex dispersion. This term can also include latex encapsulated pigments where a pigment is at least partially encapsulated with a latex polymer.

As used herein, "surface dielectric constant" or "dielectric constant" can be used as an approximation for polarity and can be calculated for the polymer latexes of the present invention. As such, a detailed explanation is required. Table 1 below provides, by way of example, certain homopolymers values for homopolymers that can be used to predict surface dielectric constants of latex copolymers in accordance with principles of the present invention. Such predictions can be made in accordance with accepted Bicerano correlations, reported in *Predictions of Polymer Properties*, Bicerano, Jozef, Marcel Dekker, Inc., New York, N.Y., 1996. Table 1 should not be construed as including all homopolymers that can be used to make latex in accordance with principles of the present invention. Additionally, not all of the homopolymers listed in Table 1 are effective for use in making the latex particulates in accordance with principles of the present invention. Table 1 is merely provided to teach what is meant by the terms "surface dielectric constant" or "dielectric constant."

TABLE 1

Homopolymer dielectric constant values

| Monomer | W | $E_{coh1}$ | $V_w$ | $N_{dc}$ | $\epsilon$ | $T_g$ |
|---|---|---|---|---|---|---|
| n-octyl methacrylate | 198.31 | 69686 | 127.08 | 24 | 2.45 | −20 |
| styrene | 104.15 | 39197 | 64.04 | 10 | 2.55 | 99.9 |
| cyclohexyl methacrylate | 168.24 | 59978 | 99.86 | 24 | 2.58 | 103.9 |
| hexyl methacrylate | 170.23 | 59804 | 106.70 | 24 | 2.69 | −5.2 |
| isobutyl methacrylate | 142.20 | 48496 | 85.60 | 224 | 2.70 | 47.9 |
| t-butyl methacrylate | 142.20 | 46427 | 84.94 | 24 | 2.73 | 107 |
| sec-butyl methacrylate | 142.20 | 48872 | 86.92 | 24 | 2.75 | 57 |
| 2-ethylhexyl methacrylate | 198.31 | 77980 | 127.65 | 24 | 2.75 | 5.2 |
| n-butyl methacryalte | 142.20 | 49921 | 86.33 | 24 | 2.77 | 20 |
| n-butyl acrylate | 128.17 | 46502 | 76.82 | 24 | 2.87 | −54 |
| benzyl methacryalte | 176.22 | 64919 | 98.40 | 24 | 2.90 | — |
| hexyl acrylate | 156.23 | 65352 | 98.56 | 24 | 2.91 | −57.2 |
| ethyl methacrylate | 114.15 | 40039 | 65.96 | 24 | 3.00 | 50.9 |
| methyl methacrylate | 100.12 | 35097 | 54.27 | 24 | 3.10 | 104.9 |
| methyl acrylate | 86.09 | 31678 | 44.76 | 24 | 3.28 | 8 |
| ethylene glycol di methacrylate | 198.22 | 88978 | 111.69 | 48 | 3.35 | — |
| methacrylic acid | 86.09 | 38748 | 45.99 | 24 | 3.52 | 187 |
| hydroxyethyl methacrylate | 130.14 | 66502 | 69.44 | 36 | 3.74 | 86 |
| methacryloyl-oxyethyl succinate | 230.22 | 111243 | 116.06 | 72 | 3.84 | 58.3 |
| acrylic acid | 72.06 | 35329 | 36.48 | 24 | 3.90 | 106 |

In Table 1 above, the abbreviations used are defined as follows:
W      Monomer molecular weight (grams/mole)
$E_{coh1}$   Cohesive energy (joules/mole)
$V_w$    Van der Waals volume (cm$^3$/mole)
$N_{dc}$   Fitting parameter (cm$^3$/mole)
$\epsilon$     Dielectric constant (no units)
$T_g$    Glass transition temperature (Celsius)

From these values, the surface dielectric constant of latex copolymers formed by copolymerization of any combination of these monomers (or other known monomers where these values are available) may be predicted using the following Bicerano correlations:

$$\text{Dielectric constant } (\epsilon) = 1.412014 + (0.001887 E_{coh1} + N_{dc})/V_w \quad \text{FORMULA 1}$$

In the above Formula 1, $\epsilon$ represents the surface dielectric constant of the homopolymer. The terms $E_{coh1}$, $N_{dc}$, $V_w$, are the molar fraction sum of the homopolymer cohesive energies, fitting parameters, and van der Waals volumes, respectively. For copolymers, the dielectric constant can be calculated by taking a weighted average of the individual monomers, represented by the homopolymer values in Table 1.

As used herein, "$T_g$" generally refers to the glass transition temperature of a polymer. Generally, the glass transition temperature is the temperature, below which the physical properties of amorphous materials vary in a manner similar to those of a crystalline phase (glassy state), and above which amorphous materials behave like liquids (rubbery state). A material's glass transition temperature is the temperature below which molecules have little relative mobility. When referring to a monomer, the $T_g$ is the value associated with the homopolymer for the given monomer. A method of predicting a latex particulate having a film-forming $T_g$ based on the monomer's homopolymer $T_g$ values is provided below (See Homopolymer values in Table 1 above). A copolymer latex particulate's $T_g$ can be derived from individual monomer homopolymer $T_g$ values by using the following equation:

$$\frac{1}{T_g} = \left(\frac{W_1}{T_{g1}} + \frac{W_2}{T_{g2}} + \frac{W_3}{T_{g3}} + ...\right) \quad \text{FORMULA 2}$$

where $T_g$ represents the glass transition temperature of the copolymer synthesized from any number of monomers. The formula shows three monomers represented by subscripts; however, the formula can be expanded to more than three monomers or reduced to two monomers as desired, indicated by the ellipsis. $W_1$ is the weight fraction of the first monomer and the $T_{g1}$ is the $T_g$ of the first monomer. Second and third monomers are similarly represented by $W_2$, $T_{g2}$, $W_3$, and $T_{g3}$, respectively.

As used herein, "plurality" refers to more than one. For example, a plurality of monomers refers to at least two monomers.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

It has been recognized that it would be advantageous to develop latex ink compositions that provide durability, jettability, and reliability. In accordance with this, the present invention is drawn to methods of formulating latex inks and selecting monomers for latexes. It is noted that when discussing a method of formulating a latex ink or selecting a monomer for a latex, each of these discussions can be considered applicable to each of these embodiments, whether or not they are explicitly discussed in the context of that embodiment. Thus, for example, in discussing the monomers present in a latex ink, those monomers can also be used in the method for formulating the latex ink or the method of selecting a monomer for a latex ink, and vice versa.

In a first embodiment, a method of formulating a latex ink composition for a specific application temperature can be achieved by determining an application temperature for the latex ink composition; choosing at least one polar monomer having a dielectric constant of at least about 3.1; synthesizing latex particulates using the polar monomer; and admixing the latex particulates with a colorant, in a liquid vehicle, to form the latex ink composition. The latex particulates can be film forming at or below the application temperature. Furthermore, the $T_g$ of the latex particulates is less than the application temperature, the application temperature minus the application temperature being no more than about 15° C.

In another embodiment, a method of preparing film-forming latex particulates for printing with thermal ink-jet includes the steps of: selecting at least three monomers, at least one of which being polar and having a dielectric constant of at least about 3.1, and copolymerizing the monomers at a ratio such that the resultant latex particulates have physical properties suitable for forming a film when thermally ink-jetted on a media substrate. The synthesized latex particulates can have a dielectric constant of at least about 3.1, and can have a $T_g$ within 5° C. of the temperature required for the latex particulates to form the film. In one embodiment, the dielectric constant can be of at least about 3.2. In another embodiment, the dielectric constant can be of at least about 3.3. The monomer group can include at least two polar monomers having a dielectric constant can be of at least about 3.1, and the step of selecting the monomers can include selecting at least two polar monomers. The two polar monomers can have a dielectric constant of at least about 3.2 and even 3.3. In one embodiment, all three monomers can be polar monomers having a dielectric constant of at least about 3.1. In another embodiment, the group of monomers can include at least three monomers having a dielectric constant in the top 5% of all known monomers in the art.

The present latexes can be admixed with other components to form a latex ink. For example, the latex particulates can be admixed with a colorant and solvent to form a latex ink. Other additives can also be present in the latex ink such as, but not limited to, surfactants, biocides, fungicides, sequestering agents, buffers, cosolvents, and viscosity modifiers. In one embodiment, the latex particulate can encapsulate the colorant.

Thus, the present invention provides methods of formulating latex inks suitable for ink-jet applications. As such, the applications of the present invention generally include any applications utilizing ink-jet technology. Additionally, the present latex ink compositions can be used in other applications such as, but not limited to, coatings, paints, and shellacs. The desired application temperature can be determined as the maximum temperature that the latex particulate experiences during processing. For example, in ink-jet printing, the application temperature can be the highest temperature that the latex ink achieves during ink-jetting. Generally, application temperatures can be from about 20° C. to about 100° C. In one embodiment, the application temperatures can be from about 20° C. to about 50° C.

As previously discussed, the methods of the present invention can be used in a variety of applications, and as such, a number of latexes may be formulated based on a desired $T_g$. Generally, an appropriate $T_g$ for a given application is one that is durable but still film forming at the application temperature. Durability is generally directly proportional to the $T_g$, i.e. a higher $T_g$ generally provides a more durable latex. Film forming is generally inversely proportional to the $T_g$; i.e. a lower $T_g$ provides a better film-forming latex. In order to maximize these properties, a $T_g$ can be selected as to be film-forming at a maximum temperature. Additionally, the latex particulate can be formulated to improve jettability. The present invention provides a method for formulating latexes having superior jettability, durability, and reliability by utilizing this maximized film-forming $T_g$ in combination with a high dielectric constant; obtained by selecting polar monomers.

Generally, the functional $T_g$ can be from about 0° C. to about 100° C. In one embodiment, the functional $T_g$ can be from about 5° C. to about 100° C. In another embodiment the $T_g$ can be from about 0° C. to about 50° C. In yet another embodiment the $T_g$ can be from about 5° C. to about 50° C. Generally, for the purposes of the present invention, polar monomers can be quantified as those having a dielectric constant of at least 3.1. In one embodiment, the dielectric constant of the monomer or resulting copolymer latex particulate can be of at least 3.2. In another embodiment, the dielectric constant of the monomer or resulting copolymer latex particulate can be of at least 3.3.

Specific latex particulates that can be used include those prepared using a monomer emulsion of various weight ratios of styrenes, $C_1$ to $C_8$ alkyl methacrylates, $C_1$ to $C_8$ alkyl acrylates, ethylene glycol methacrylates and dimethacrylates, methacrylic acids, acrylic acids, and the like, which can be copolymerized to form the latex. For example, methyl acrylate can be polymerized with acrylic acid. Though this latex particulate example is provided, other combinations of monomers can be used to form latex particulates.

It should be noted that the invention is not the mere use of these monomers in forming latexes for ink-jet inks, as many of these monomers have been generally used in the prior art. Rather, the invention is drawn to formulating latex ink compositions for a specific application temperature, i.e. considering monomer properties, selecting appropriate monomers, selecting appropriate ratios of monomers, matching resultant polymer against application temperature, etc., to achieve more optimal latex properties.

Generally, at least one of the monomers chosen can be polar to improve jettability, which has been characterized using the dielectric constant formula, as previously discussed. However, the use of a mixture of polar and non-polar monomers can be used in accordance with the embodiments of the present invention, since the resulting copolymer latex particulate can still achieve desired dielectric constant properties. In one embodiment, the copolymer particulate latex can be synthesized from two polar monomers. The latex particulate can be synthesized using any reaction scheme that produces a latex particulate. In one embodiment, the latex particulate can be synthesized from suspension polymerization, reverse suspension polymerization, emulsion polymerization, or reverse emulsion polymerization.

The methods of the present invention can improve the drop velocities of the ink compositions. In one embodiment, the drop velocity can be at least 6 m/s. In another embodiment, the drop velocity can be at least 7 m/s. The drop velocity of a latex ink having a specific $T_g$ and latex particulates with at least a dielectric constant of 3.2 can be 10% higher than a similar latex ink having the same $T_g$ but with latex particulates with at most a dielectric constant of 3.1. In one embodiment, the at least 3.2 latex ink can have a 15% or even 20% higher drop velocity than latex inks that have a dielectric constant below 3.1.

In each of the above embodiments, typical liquid vehicle formulations that can be used with the inks, ink sets, and methods of the present invention can include water and one or more co-solvent, present in total at from 5.0 wt % to 50.0 wt % by weight. One or more non-ionic, cationic, and/or anionic surfactant can also be present, and if present, can be included at from 0.01 wt % to 10.0 wt %. Other vehicle components known in the art such as biocides, viscosity modifiers, materials for pH adjustment, sequestering agents, preservatives, latexes, polymers, and the like, can also be present.

Classes of solvents or co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, 1-6-alcohols, ethylene glycol alkyl ethers, propylene glycol alkyl ethers, higher homologs of polyethylene glycol alkyl ethers, substituted and unsubstituted lactams, N-alkyl caprolactams, unsubstituted caprolactams, both substituted and unsubstituted formamides, both substituted and unsubstituted acetamides, and the like. Specific examples of solvents that can be used include 1-(2-hydroxyethyl)-2-pyrrolidinone, 2-pyrrolidinone, and 1,6-hexanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents such as EDTA (ethylene diamine tetra acetic acid) may be included to eliminate the deleterious effects of heavy metal impurities, and buffer solutions may be used to control the pH of the ink. From 0.001% to 2.0% by weight, for example, of either of these components can be used. Viscosity modifiers and buffers may also be present, as well as other additives known to those skilled in the art to modify properties of the ink as desired. Such additives can be present at from 0.01% to 20% by weight.

EXAMPLES

The following examples illustrate various aspects of the latexes and latex inks prepared in accordance with embodiments of the present invention. The following examples should not be considered as limitations of the invention, but should merely teach how to make the best latexes and latex inks presently known.

Example 1

Latex Particulate Incorporating Methyl Acrylate Monomer (MA)

A latex particulate is formulated in accordance with Table 1, which has an expected dielectric constant of about 3.34. This latex is formulated to be particularly acceptable for thermal ink-jet printing from ink-jet architecture which generates ink temperatures from about 35° C. to 60° C. The $T_g$ of the latex particle is 50° C.

TABLE 1

| Latex Component | Wt % |
| --- | --- |
| Methyl Acrylate | 10.0 |
| Acrylic Acid | 1.0 |
| Hexadecane | 0.5 |
| Surfactant | 1.0 |
| Water | 87.5 |

Example 2

Latex Particulate Incorporating Methyl Methacrylate and Butyl Acrylate Monomer

A latex particulate is formulated in accordance with Table 2, which has an expected dielectric constant of about 3.05. This latex is not as polar (referred to as "non-polar") as that of Example 1, and is generated for comparison purposes.

TABLE 2

| Latex Component | Wt % |
| --- | --- |
| Methyl Methacrylate | 5.0 |
| Butyl Acrylate | 5.0 |
| Acrylic Acid | 1.0 |
| Hexadecane | 0.5 |
| Surfactant | 1.0 |
| Water | 87.5 |

Example 3

Latex Particulate Incorporating Methyl Methacrylate and Methyl Acrylate Monomer

Three monomers are selected for possible latex polymerization, including methyl methacrylate, methyl acrylate, and butyl acrylate. Methyl methacrylate and methyl acrylate are chosen for latex formulation because they are the two most polar monomers of the three selected for consideration and have dielectric constants of 3.10 and 3.28, respectively. Thus, a latex is formulated in accordance with Table 3, which has an expected dielectric constant of about 3.21. The $T_g$ of the latex particulate is 5° C.-10° C. and is within 5° C. of the film-forming temperature.

TABLE 3

| Latex Component | Wt % |
| --- | --- |
| Methyl Methacrylate | 5.0 |
| Methyl Acrylate | 5.0 |
| Methacrylic Acid | 1.0 |
| Hydroxyethyl Acrylate | 0.50 |
| Hexadecane | 0.50 |
| Surfactant | 1.0 |
| Water | 87.0 |

Example 4

Latex Particulate Incorporating Methyl Methacrylate and Butyl Acrylate Monomer

A latex particulate is formulated in accordance with Table 4, which has an expected dielectric constant of about 3.06. This latex is not as polar (referred to as "non-polar") as that of Example 3, and is generated for comparison purposes.

TABLE 4

| Latex Component | Wt % |
| --- | --- |
| Methyl Methacrylate | 7.5 |
| Butyl Acrylate | 2.5 |
| Methacrylic Acid | 1.0 |
| Hydroxyethyl Acrylate | 0.50 |
| Hexadecane | 0.50 |
| Surfactant | 1.0 |
| Water | 87.0 |

Example 5

Latex Inks 1 and 2

Polar and non-polar latex inks were formulated using the latexes of Examples 1 and 2 in accordance with Table 5 and 6, respectively. The latex particulates of each ink had a $T_g$ of about 50° C.

TABLE 5

Latex Ink 1

| Component | Wt % |
| --- | --- |
| Cyan Pigment | 1-3 wt % |
| Latex from Example 1 | 1-4 wt % |
| Co-solvent system<br>2-pyrrolidinone, glycerol<br>1,2 hexanediol<br>diethylene glycol | 8-15 wt % |
| Resin | 0.1-2.0 wt % |
| Surfactant | 0.05-2.0 wt % |
| Preservative/Anti-microbial | 0.05-2.0 wt % |
| Water | balance |

TABLE 6

Latex Ink 2

| Component | Wt % |
| --- | --- |
| Cyan Pigment | 1-3 wt % |
| Latex from Example 2 | 1-4 wt % |
| Co-solvent system<br>2-pyrrolidinone<br>glycerol<br>1,2 hexanediol<br>diethylene glycol | 8-15 wt % |
| Resin | 0.1-2.0 wt % |
| Surfactant | 0.05-2.0 wt % |
| Preservative/Anti-microbial | 0.05-2.0 wt % |
| Water | balance |

Table 7 represents drop velocity data using the inks formulated in accordance with Tables 5 and 6, respectively. The specific pigment and latex $T_g$ are listed. The study shows that the more polar monomer considerably increased the drop velocity of latex ink 1 as compared to latex ink 2 having the less poplar monomer.

TABLE 7

Drop Velocity data of Latex Ink 1 and Latex Ink 2

| Time (s) | Latex Ink 1 drop velocity (m/s) | Time (s) | Latex Ink 2 drop velocity (m/s) |
| --- | --- | --- | --- |
| 1.019531 | 7.46 | 1.019531 | 1.87 |
| 2.003906 | 6.03 | 2.007813 | 0.15 |
| 3.023438 | 6.02 | 3.007813 | 2.01 |
| 4.042969 | 6.53 | 4.011719 | 4.09 |
| 4.996094 | 5.7 | 4.984375 | 2.12 |
| 6.125 | 8.6 | 6.082031 | 1.67 |
| 7.019531 | 5.89 | 7.191406 | 0.43 |
| 8.003906 | 6.76 | 7.976563 | 0.23 |
| 9.007813 | 6.47 | 9.261719 | 2.92 |
| Average | 6.61 | Average | 1.72 |

Example 6

Latex Inks 3 and 4

Polar and generally non-polar (MMA/BA2) latex inks were formulated using the latexes of Examples 3 and 4 in accordance with Table 8 and 9, respectively. The latex particulates of each ink had a $T_g$ of about 5-10° C.

TABLE 8

| Component | Wt % |
| --- | --- |
| Yellow Pigment | 1-3 wt % |
| Latex from Example 3 | 1-4 wt % |
| Co-solvent system (including 2-pyrrolidinone, glycerol, 1,2 hexanediol and diethylene glycol) | 8-15 wt % |
| Resin | 0.1-2.0 wt % |
| Surfactant | 0.05-2.0 wt % |
| Preservative/Anti-microbial | 0.05-2.0 wt % |
| Water | balance |

TABLE 9

| Component | Wt % |
| --- | --- |
| Cyan Pigment | 1-3 wt % |
| Latex from Example 4 | 1-4 wt % |
| Co-solvent system (including 2-pyrrolidinone, glycerol, 1,2 hexanediol and diethylene glycol) | 8-15 wt % |
| Resin | 0.1-2.0 wt % |
| Surfactant | 0.05-2.0 wt % |
| Preservative/Anti-microbial | 0.05-2.0 wt % |
| Water | balance |

Table 10 represents drop velocity data using the inks formulated in accordance with Tables 8 and 9. The specific pigment and $T_g$ are listed in the Table. The study shows that the more polar monomer substantially increased the drop velocity of latex ink of Table 8 as compared to latex ink of Table 9, which had less poplar monomers. Additionally, drop velocities of over 6 m/s and 7 m/s were readily achieved by latex ink prepared in accordance with Table 8.

TABLE 10

Drop Velocity data of Latex Ink 3 and Latex Ink 4

| Time (s) | Latex Ink 3 drop velocity (m/s) | Time (s) | Latex Ink 4 drop velocity (m/s) |
| --- | --- | --- | --- |
| 1.011719 | 7.08 | 1.027344 | 6.33 |
| 2.025391 | 7.19 | 2.023438 | 5.32 |
| 3.007813 | 7.34 | 3.037109 | 6.18 |

TABLE 10-continued

Drop Velocity data of Latex Ink 3 and Latex Ink 4

| Time (s) | Latex Ink 3 drop velocity (m/s) | Time (s) | Latex Ink 4 drop velocity (m/s) |
|---|---|---|---|
| 4.005859 | 7.38 | 4.035156 | 5.86 |
| 4.986328 | 7.33 | 4.9375 | 5.63 |
| 6.140625 | 6.73 | 6.123047 | 5.8 |
| 7.027344 | 7.37 | 7.056641 | 5.42 |
| 8.009766 | 6.74 | 8.039063 | 6.28 |
| 9.007813 | 7.3 | 9.021484 | 5.13 |
| Average | 7.16 | Average | 5.77 |

Of course, it is to be understood that the above-described formulations and arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A method of formulating a latex ink composition for a specific application temperature, comprising
   a) determining an application temperature for the latex ink composition;
   b) choosing at least one polar monomer having a dielectric constant of at least about 3.1;
   c) synthesizing latex particulates of polymeric masses using the at least one polar monomer; and
   d) admixing the latex particulates with a colorant, in a liquid vehicle comprising an aliphatic alcohol and a surfactant, to form the latex ink composition;
   wherein the latex particulates exclude the colorant and are film forming at or below the application temperature, the application temperature being the highest temperature that the latex particulate achieves during ink-jetting, and wherein the $T_g$ of the latex particulates is less than the application temperature, the application temperature minus the $T_g$ being no more than about 15° C.

2. The method of claim 1, wherein the latex ink composition is formulated for thermal ink-jet application.

3. The method of claim 1, wherein the $T_g$ is from about 5° C. to about 100° C.

4. The method of claim 1, wherein the dielectric constant is at least about 3.2.

5. The method of claim 1, wherein the latex particulates have a dielectric constant of at least about 3.1.

6. The method of claim 5, wherein the dielectric constant is at least about 3.2.

7. The method of claim 1, wherein the application temperature is from about 20° C. to about 100° C.

8. The method of claim 1, wherein the latex ink composition, when thermally ink jetted at the application temperature, has a drop velocity of at least about 6 m/s.

9. The method of claim 1, wherein the latex ink composition, when thermally ink jetted at the application temperature, has a drop velocity of at least about 7 m/s.

10. The method of claim 1, wherein the latex particulates are synthesized from two polar monomers.

11. The method of claim 1, wherein the latex particulates are synthesized from suspension polymerization, reverse suspension polymerization, emulsion polymerization, or reverse emulsion polymerization.

12. The method of clam 11, wherein the latex particulates are synthesized from emulsion polymerization.

13. The method of claim 1, wherein the application temperature minus the $T_g$ being no more than about 5° C.

* * * * *

UNITED STATES PATENT AND TRADEMARK OFFICE
CERTIFICATE OF CORRECTION

PATENT NO. : 8,133,934 B2  
APPLICATION NO. : 11/796629  
DATED : March 13, 2012  
INVENTOR(S) : Hui Liu et al.

Page 1 of 1

It is certified that error appears in the above-identified patent and that said Letters Patent is hereby corrected as shown below:

In column 12, line 30, in Claim 12, delete "clam" and insert -- claim --, therefor.

Signed and Sealed this
Nineteenth Day of February, 2013

Teresa Stanek Rea
*Acting Director of the United States Patent and Trademark Office*